(12) United States Patent
Aznar et al.

(10) Patent No.: US 6,680,951 B1
(45) Date of Patent: Jan. 20, 2004

(54) SYSTEM AND METHOD FOR SELECTING MULTI-RATE PORTS IN A DATA TRANSMISSION NETWORK

(75) Inventors: Ange Aznar, La Colle-sur-Loup (FR); Jose Iruela, St Laurent du Var (FR); Daniel Orsatti, La Gaude (FR); Dominique Rigal, Nice (FR)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 09/691,390

(22) Filed: Oct. 18, 2000

(30) Foreign Application Priority Data

Oct. 21, 1999 (EP) .............................................. 99480106

(51) Int. Cl.[7] .............................................. H04L 12/66

(52) U.S. Cl. ........................ 370/463; 370/412; 370/419; 710/36

(58) Field of Search ................................ 370/392, 252, 370/419, 412, 463; 710/129, 63, 36; 709/249, 224

(56) References Cited

U.S. PATENT DOCUMENTS 4,751,634 A  *  6/1988  Burrus, Jr. et al. ............ 710/63
5,862,338 A  *  1/1999  Walker et al. .............. 709/224

* cited by examiner

Primary Examiner—John Pezzlo
(74) Attorney, Agent, or Firm—Daniel E. McConnell; Bracewell & Patterson

(57) ABSTRACT

A system and method for selecting one port among multiple output ports having various transmission rates attached to an output adapter of a switching node in a data transmission network and enabling it to transmit its data over the network. The system of the present invention includes a storage device that contains a list of identification codes for the ports. The identification code list is arranged in a prioritized order from the port having the highest transmission rate to the port having the lowest transmission rate. The system further includes port service request means that generate a service request signal for each port, wherein the service request signal has a frequency corresponding to the transmission rate of the object port. Port selection means are utilized to, in response to said identification codes and said service request signal, select a requesting port having a highest priority according to its identification code and enabling the selected port to transmit data over the date transmission network.

10 Claims, 2 Drawing Sheets

SYSTEM AND METHOD FOR SELECTING MULTI-RATE PORTS IN A DATA TRANSMISSION NETWORK

BACKGROUND OF THE INVENTION

1. Technical Field

The present invention relates generally to transmission of data from ports associated with an output adapter in a date transmission network such as an asynchronous transfer mode (ATM) network. In particular the present invention relates to a device for selecting multi-rate ports in accordance with their respective transmission rates.

2. Description of the Related Art

Advancing semiconductor technology evolution has produced high networking protocol engines within switching nodes of a data transmission network such as an ATM network. In ATM broadband networking technology, the current designed transmission rate is in the range of 2.5 Gigabits/s in support of high speed intermediary devices such as the OC48 physical interface.

High-capacity network engines may be utilized to process traffic from higher rate ports as well as being shared by several lower rate ports. For example, existing protocol engines that are designed to support an OC12 port (622 Mbps) can also process the traffic from four OC3 ports. The higher the processing capacity, the higher the number of port combinations that can be supported. In practice, an OC48 protocol engine could support one OC48 port or four OC12 ports or sixteen OC3 ports or mixed combination such as one OC12 and twelve OC3, or three OC12 and four OC3.

Providing such flexibility to the customer is advantageous for a customer who may not necessarily require a sixteen OC3 port adapter. In addition, the multi-port approach permits a reduction in switching equipment cost since an integrated protocol engine is shared by several ports.

In practice, an engine that is capable of processing 2.5 Gbps of ATM traffic is also capable of processing a 15 53 byte ATM cell every 169.6 ns. On the adapter receive side of the engine, the aggregate flow received is simply composed of the flows received on the various ports. In this context, a multiplexer logic device is utilized to feed the protocol engine with the traffic from the various ports of the input adapter. The only constraint for the input traffic is that the sum of the port rates must be lower than the engine processing capacity.

On the transmit side (output adapters), the problem is very different. As for the receive side, the protocol engine receives traffic from the switching fabric of the switching node at the aggregate rate and processes this traffic: flow identification such as the lookup of the ATM label, flow classification with respect to the traffic class priorities, congestion management, and finally queuing of the incoming cell in the appropriate queue. Once this process is completed, the outgoing traffic must then be sent over the various ports attached to the output adapter. This means that the processing power of the protocol engine must be shared between the ports.

For a case in which there is a single port, or in for cases in which all ports have an equal transmission rate, the design goal is simply to sharing the outgoing traffic equally among the various ports. Assuming, however, that the ports comprise a mixed configuration consisting of, for example, one OC12 port and twelve OC3 ports, an equal share of the aggregate rate of 2.5 Gbps provides to each port a service requirement of 2.5 Gbps/13=192 Mbps. Such a rate is too high for an OC3 port which has a capacity of 155 Mbps, and too low for the OC12 port which has a capacity of 622 Mbps.

Furthermore, it may be necessary for a switching node to be able to control the rate at which the traffic is sent over a physical port practically transmitted at a programmable rate lower than the physical rate of the port. This can be practically the case when the rates in the network backbone such as E2 or E3 links are lower than the access rates of the ports (for example OC3).

It would therefore be useful to provide a system and method for distributing output traffic from a high capacity network engine to multiple multi-rate ports in a distributed manner such that the maximum output rate of the engine is realized without overloading individual output ports.

SUMMARY OF THE INVENTION

A system and method for selecting one port among multiple output ports having various transmission rates attached to an output adapter of a switching node in a data transmission network and enabling it to transmit its data over the network are disclosed herein. The system of the present invention includes a storage device that contains a list of identification codes for the ports. The identification code list is arranged in a prioritized order from the port having the highest transmission rate to the port having the lowest transmission rate. The system further includes port service request means that generate a service request signal for each port, wherein the service request signal has a frequency corresponding to the transmission rate of the object port. Port selection means are utilized to, in response to said identification codes and said service request signal, select a requesting port having a highest priority according to its identification code and enabling the selected port to transmit data over the date transmission network.

All objects, features, and advantages of the present invention will become apparent in the following detailed written description.

BRIEF DESCRIPTION OF THE DRAWINGS

The objects, features and advantages of the invention will be better understood by reading the following description of the invention in referenced to the accompanying drawings wherein.

DETAILED DESCRIPTION OF THE PREFERRED EMBODIMENT

In the following description, it is assumed that n ports, $P_1$ to $P_n$, are attached to an output port of a switching node in an ATM data transmission network, and each transmit ATM cells at different rates. It should be noted that, if these transmission rates are $R_1, R_2, \ldots R_n$, and if C is the total rate capacity of the output adapter, these rates must meet the following requirement:

$$R_1 + R_2 + \ldots R_n \leq C.$$

The system and method of the present invention addresses the problem of selecting and enabling each port to transmit associated cells at a rate for which the port is designed.

Figure 1:
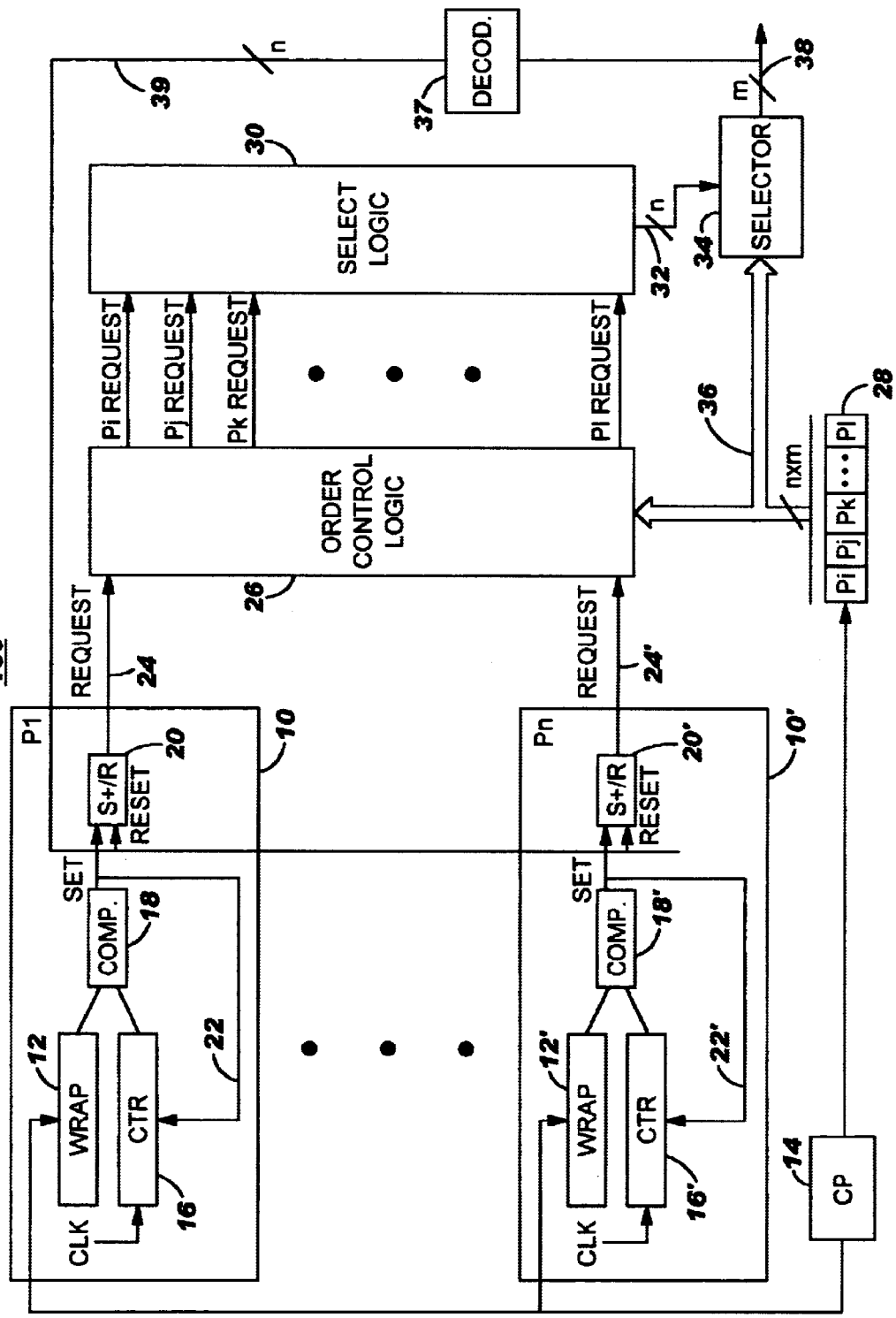
FIG. 1 is a block diagram illustrating a multi-rate port selection device in accordance with a preferred embodiment of the present invention.

With reference now to the figures wherein like reference numerals refer to like and corresponding parts throughout, and in particular with reference to FIG. 1, there is depicted a block diagram illustrating a multi-rate port selection device 100 in accordance with a preferred embodiment of the present invention. As illustrated in FIG. 1, each port within device 100 includes a requesting unit such as requesting unit 10 for port $P_1$, and requesting unit 10' for port $P_n$.

Each requesting unit includes a port wrap-value register 12 (or 12') which is loaded by a control point 14 of the switching node with a wrap value. The contents of a counter 16 (or 16') that is incremented by a clock (CLK) are continuously compared with the wrap value loaded in register 12 by a comparator 18 (or 18').

The wrap value loaded by control point 14 into wrap-value register 12 is the number of clock periods (time periods between clock pulses) that occur during one period corresponding to the data transmission rate associated with the object port. For example, assuming that a clock provides a pulse every 10 ns, the wrap value will be 25 if the transmission rate of the object port is 4 MHZ.

When counter 16 (or 16') reaches the wrap-value loaded in register 12 (or 12'), a set signal is supplied at the output of comparator 18 (or 18'). This set signal sets a latch 20 (or 20') and also resets counter 16 (or 16') on line 22 (or 22'). In response to being set by the set signal from comparator 18, latch 20 (or 20') transmits a request signal on line 24 (or 24') to an order control logic device 26.

A port service order register 28 (or other storage means) has previously been loaded by control point 14 with a list of identification codes for ports $P_1$ to $P_n$. This identification codes list is arranged in a prioritized order from the port having the lowest transmission rate. Therefore, the sequence of a identification code list, such as $P_i$, $P_j$, $P_k$, $P_1$ loaded in register 28, has no correlation to the physical list $P_1$, $P_2$ ... $P_n$ of the ports. The identification code for each port is a word of m bits such as $2^m \leq n$.

In response to requests from the physical ports, and in response to the priority listing of the ports supplied by register 28, request signals are provided by order control logic 26 on request lines arranged in the same order as the list loaded in register 28 to a select logic 30. A request signal is set to 1 in response to the corresponding port requesting to transmit, or to 0 if not. In this manner, the sequence of the request lines provides an order word wherein all bits which are set to 1 correspond to the requesting ports among the priority list loaded in register 28.

Then, in response to an order word supplied by order control logic 26, select logic 30 selects the requesting port which has the highest transmission rate; that is the first requesting port in the list $P_j$, $P_j$, $P_k$, .. $P_1$. This selection by select logic 30 is accomplished by providing on line 32 a select word of n bits wherein only one bit (corresponding to the selected port) is set to 1. This word is delivered to selector 34 which responds by selecting the identification code of the selected port on bus 36, including n sub-buses of m bits. Selector 34 transmits this identification code to transmission logic (not shown) on line 38.

The port identification code provided by selector 34 is also processed by a decoder 37. In response to receiving the port identification code, decoder 37 issues on bus 39, an n-bit word having a single bit set to 1 at the position corresponding to the selected physical port. For example, if port 3 is selected, the port identification code is 3 and the decoder output is 00100000. The bit that is set to 1 on bus 39 resets the latch of the requesting unit corresponding to this port.

Figure 2:
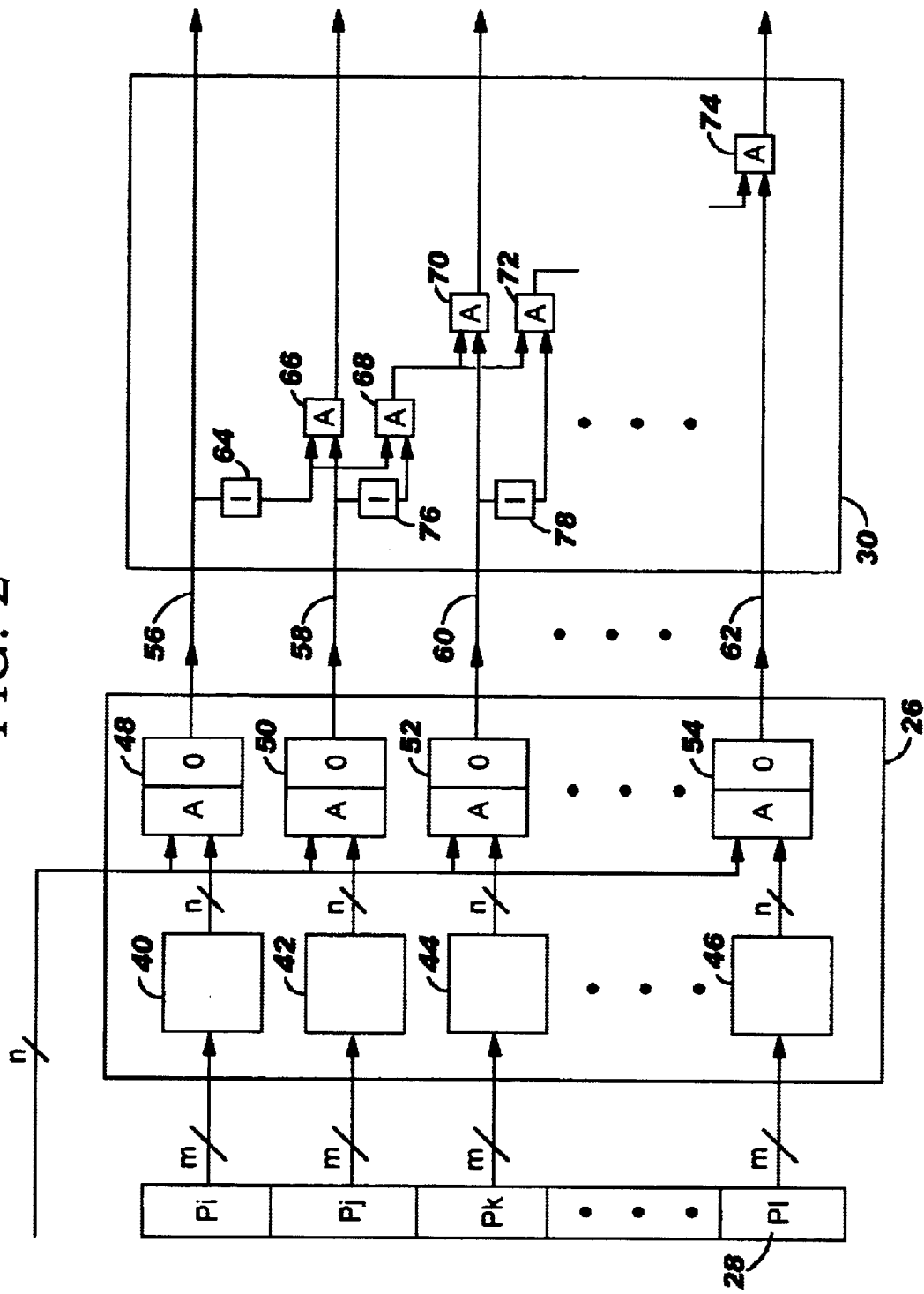
FIG. 2 is a block-diagram depicting an order control logic device and the select logic utilized in the multi-rate port selection device shown in FIG. 1.

Turning now to FIG. 2 there is illustrated a block-diagram depicting a preferred embodiment of order control logic device 26 and select logic device 30 utilized in the multi-rate port selection device shown in FIG. 1. As shown in FIG. 2, order control logic 26 includes n decoders 40, 42, 44, ... 46, that are respectively associated with an identification code of a port loaded in port service order register 28. Thus, decoder 40 corresponds to port $P_i$, decoder 42 corresponds to port $P_j$, decoder 44 corresponds to port $P_k$ and decoder 46 corresponds to port $P_1$. Each decoder receives the identification code of the port and decodes it into an n-bit word wherein all bits but one are set to 0. The single bit set to 1 corresponds to the ranking number of the port. For example, the identification code of $P_3$ is decoded into the word 00100000 and the identification code of $P_1$ is decoded into 10000000.

The output of each decoder is utilized as an input to an AND-OR circuit among AND-OR circuits 48, 50, 52, or 54 which are respectively associated with decoders 40, 42, 44, or 46. The other input of each AND-OR circuit is the request word constructed from the request signals from the ports. Such a request word is a n-bit-word wherein one or several bits are set to 1 in accordance with the requesting ports.

For a bit set to 1 by the decoder (corresponding to a requesting port), the AND-OR circuit supplies a bit set to 1 at its output. Accordingly, the order word consisting of the n outputs of decoders 48, 50, 52 and 54 is a word wherein bits set to 1 correspond to the requesting ports. These set bits are arranged according to the rate priority provided in register 28.

As previously mentioned, select logic 30 provides a select word of n bits wherein only the bit corresponding to the selected port is set to 1. Select logic 30 constructs the n-bit select word utilizing the order word at the output of order control logic 26. If the port having the highest rate requests to transmit, a bit is set to 1 on line 56 and is utilized as such in the select word at the output of select logic 30. In such a case, all the other requesting ports must be masked in the select word and the bit set to 1 on line 56 is applied to inverter 64. A zero bit is thus provided to the input of AND circuits 66 and 68 and also to the input of all AND circuits 70, 72, 74.

When a zero bit is supplied on line 56, inverter 64 provides a one bit to the inputs of AND circuits 66 and 68. Therefore, if a one bit is present on line 58, AND circuit 66 produces a one bit at its output, resulting in a select word at the output of select logic 30 having a bit set to 1 for the second port (port $P_j$ in FIG. 2). At the same time, inverter 76 provides a zero bit to the input of AND circuit 68 and therefore, all of following AND circuits 70, 72, ... and 74 have an input set to 0. Consequently, no other bits of the select word are set to 1 except the second bit.

The above process is identical when the first bit of the order word that is set to 1 is the bit on line 60. In such a case, inverter 78 provides a zero bit to all following AND circuits. When only a one bit is provided only on line 62, no other bit of the order word is set to 1. Therefore, the inputs of AND circuit 74 are set to 1, resulting in an output set to 1.

In the following example, there are five ports $P_1$ to $P_5$ having the following rates corresponding to the following frequencies:

| Port | $P_1$ | $P_2$ | $P_3$ | $P_4$ | $P_5$ |
|---|---|---|---|---|---|
| Rate | 1 MHz | 4 MHz | 1 MHz | 1 MHz | 1 MHz |

Accordingly, the contents of the port service request register is as follows:

| $P_2$ | $P_1$ | $P_3$ | $P_4$ | $P_5$ |
|---|---|---|---|---|

The values that are loaded in the wrap-value registers when the clock provides a 10 ns period between pulses are the following:

| Port | $P_1$ | $P_2$ | $P_3$ | $P_4$ | $P_5$ |
|---|---|---|---|---|---|
| Wrap-Value | 100 | 25 | 100 | 100 | 100 |

Since the aggregate rate of all ports is 8 Mbps, the period during which all ports are served at their correct rate lasts 8 times units. During this period, the various words which have been mentioned in the foregoing description are depicted in the following table that also provides the sequence of the service to ports within a period:

| Time Units | 1 | 2 | 3 | 4 | 5 | 6 | 7 | 8 |
|---|---|---|---|---|---|---|---|---|
| Requesting Ports | $P_1P_2P_3$ $P_4P_5$ | / | $P_2$ | / | $P_2$ | / | $P_2$ | / |
| Request | 11111 | 10111 | 01111 | 00111 | 01011 | 00011 | 01001 | 00001 |
| Order | 11111 | 01111 | 10111 | 00111 | 10011 | 00011 | 10001 | 00001 |
| Select | 10000 | 01000 | 1000 | 00100 | 1000 | 00010 | 10000 | 00001 |
| Selected | $P_2$ | $P_1$ | $P_2$ | $P_3$ | $P_2$ | $P_4$ | $P_2$ | $P_5$ |

While the invention has been particularly shown and described with reference to a preferred embodiment, it will be understood by those skilled in the art that various changes in form and detail may be made therein without departing from the spirit and scope of the invention.

What is claimed is:

1. A system for selecting one port among a plurality of n ports having various transmission rates attached to an output adapter of a switching node in a data transmission network, and enabling a selected port to transmit data over said data transmission network, said system comprising:
    a data store containing a port list of identification codes for said plurality of n ports, wherein said port list is arranged in a priority order from a port having a highest transmission rate to a port having a lowest transmission rate;
    port service request logic providing for each one of said ports a service request signal at a frequency corresponding to a transmission rate of each of said ports, said port service request logic having for each port:
        a counter incremented by a base clock in accordance with a base clock period; and
        a wrap-value register containing a wrap value that is equal to a number of clock periods that occur during one period corresponding to the data transmission rate associated with said port for providing said service request signal when said counter reaches said wrap value; and
    port selection logic which selects said port in accordance with said identification code and said service request signal such that a requesting port having said highest priority is selected and enabled to transmit data over said data transmission network.

2. The system of claim 1, further comprising:
    a comparator that compares said wrap value to a current value of said counter and produces an set/reset output signal in response to said current value of said counter reaches said wrap value; and
    a latch receiving an output from said comparator, wherein said latch generates said service request signal in response to being set by said set/reset signal.

3. The system of claim 2, wherein said set-reset output signal from said comparator resets said counter in response to said current value of said counter reaching said wrap value.

4. The system of claim 1, wherein said wrap value is loaded in said wrap-value register utilizing a control point within said switching node.

5. The system of claim 4, wherein said list of identification codes is loaded into said storage means by said control point.

6. The system of claim 1, wherein said port selection logic comprises:
    order control logic for providing port request signals from said ports, wherein said port request signals request to transmit in response to said identification code and said service request signal; and
    select logic for selecting said requesting port that has, said highest transmission rate to transmit.

7. The system of claim 6, wherein said order control logic comprises:
    a plurality of n decoders that are respectively associated with said plurality of ports, wherein each of said decoders generates an n-bit word having a bit corresponding to the ranking number of the associated port set to 1 in response to said identification code of said associated port; and
    a plurality of n AND-OR circuits that are respectively associated with said plurality of n decoders, wherein each of said plurality of n AND-OR circuits generate a request signal in response to said associated port requesting to transmit as communicated by said associated decoder and a request word produced from said service request signals generated by said port service request means, and wherein all said request signals provided by said AND-OR circuit form an order word which is supplied to said select logic, said order word having bits set to 1 in accordance with said requesting ports and arranged according to a priority order of said port identification codes as stored within said storage means.

8. The system of claim 7, wherein said select logic further comprises a combination of logic circuits for providing a select word having a single bit corresponding to the requesting port having the highest rate set to 1 in response to said order word provided by said order control logic.

9. The system of claim 8, further comprising a selector for selecting said requesting port having said highest transmission rate in accordance with said select word and said list of identification codes.

10. The system of claim 9, further comprising a decoder for decoding the identification code of a port selected by said selector into an n-bit word, wherein only a bit that corresponds to a physical ranking number of the selected port is utilized to reset said latch corresponding to said requesting port having said highest transmission rate.

\* \* \* \* \*